United States Patent [19]
Noda

[11] Patent Number: 5,590,103
[45] Date of Patent: Dec. 31, 1996

[54] TRACKING SERVO CIRCUIT FOR AN OPTICAL DISC PLAYER

[75] Inventor: Hidenobu Noda, Kanagawa, Japan

[73] Assignee: Sony Corporation, Tokyo, Japan

[21] Appl. No.: 384,614

[22] Filed: Feb. 3, 1995

Related U.S. Application Data

[63] Continuation of Ser. No. 149,374, Nov. 9, 1993, abandoned.

[30] Foreign Application Priority Data

Nov. 13, 1992 [JP] Japan ................................. 4-328577

[51] Int. Cl.⁶ .................................................. G11B 7/00
[52] U.S. Cl. .................................. 369/44.29; 369/44.35
[58] Field of Search ........................... 369/44.29, 44.34, 369/44.32, 44.35, 54, 44.27

[56] References Cited

U.S. PATENT DOCUMENTS

| | | | |
|---|---|---|---|
| 4,817,073 | 3/1989 | Suzuki | 369/44.29 X |
| 5,048,002 | 9/1991 | Horie et al. | 369/44.35 |
| 5,054,013 | 10/1991 | Kawamura | 369/44.28 |
| 5,195,067 | 3/1993 | Yanagi | 369/44.28 X |
| 5,202,864 | 4/1993 | Moriya et al. | 369/44.28 |

FOREIGN PATENT DOCUMENTS 0502243  9/1992  European Pat. Off. .

OTHER PUBLICATIONS

Patent Abstracts of Japan vol. 12, No. 309 (P–748) 23 Aug. 1988.
Patent Abstracts of Japan vol. 9, No. 195 (P–379) 13 Aug. 1985.
Patent Abstracts of Japan vol. 15, No. 268 (P–1224) 8 Jul. 1991.

*Primary Examiner*—Andrew L. Sniezek
*Attorney, Agent, or Firm*—William S. Frommer; Alvin Sinderbrand

[57] ABSTRACT

A tracking servo circuit in which a tracking error signal obtained when tracking servo at disc player initialization is off is captured, its center level is calculated, the calculated center level is held in a register 17, and the center level held in the register 17 is subtracted from a tracking error signal obtained when the tracking servo is on. Consequently, an offset of the tracking error signal caused by a sensitivity imbalance between tracking servo photodiodes due to their aging or the like is detected to be securely corrected, thereby enhancing playability of a disc player in which the tracking servo circuit according to the invention is used.

7 Claims, 4 Drawing Sheets

F I G. 5(a) VTE
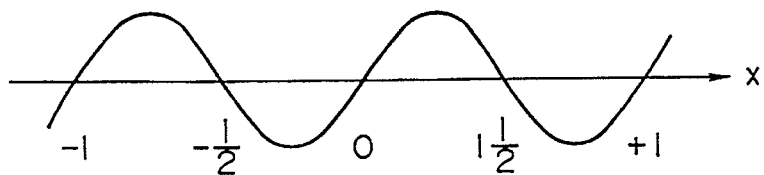
F I G. 5(b) $\frac{R2}{R1}$ VE
F I G. 5(c) $\frac{R2}{R1}$ VF
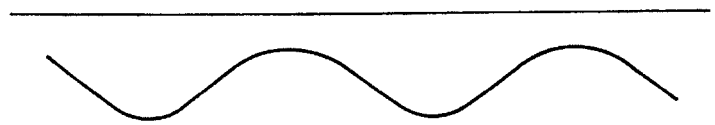
F I G. 5(d)
F I G. 5(e)
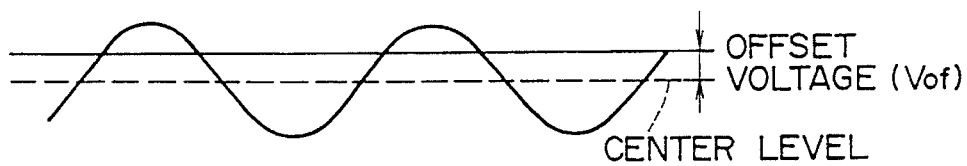
OFFSET VOLTAGE (Vof)
CENTER LEVEL
F I G. 5(f)
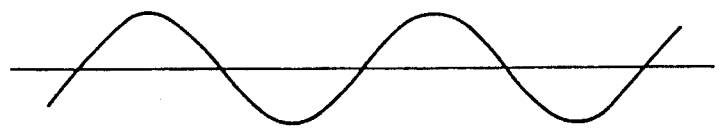

TRACKING SERVO CIRCUIT FOR AN OPTICAL DISC PLAYER

This application is a continuation of application Ser. No. 08/149,374, filed Nov. 9, 1993, now abandoned.

BACKGROUND OF THE INVENTION

1. Field of the Invention

The present invention relates to a tracking servo circuit in an optical disc player and, more particularly, to a tracking servo circuit suitably used for correcting an offset of a tracking error signal caused by a sensitivity imbalance in a tracking servo photo diode when a so-called three-spot method is used for generating the tracking error signal.

2. Description of the Related Art

In an optical disc player, correctly reading pit information formed on a disc requires tracking servo control for controlling a relative position of a light beam spot across the disc so that a track along which information pits are arranged is correctly traced.

In the above-mentioned tracking servo control, based on a beam reflected from a disc surface on which the information track is formed, a deviation of the light beam spot relative to the track across the disc is detected as a tracking error signal. Then, a tracking actuator is driven by a voltage corresponding to an amplitude of the tracking error signal to continuously correct the beam spot position so that the spot is always controlled to trace the track at its center line.

Known as a typical way of producing the tracking error signal is the three-spot method.

In this method, three light beams are projected onto the surface of the disc to form three spots along a same straight line at a same interval. The straight line is always kept at a certain angle to the disc track.

Of the three light beams, a central beam or a main beam is used for information reading and focus servo control and two side light beams are used for tracking servo control.

The two side light beams are reflected from the disc surface to be received by two photodiodes. A difference between outputs of the two photodiodes is used as the tracking error signal.

Ideally, the tracking error signal is zero when the main beam spot is positioned at a center of the track and, as the spot departs from the center, an amplitude of the signal increases in a polarity in which the departure takes place, thereby presenting a characteristic of a generally "S" curve.

However, if there is a difference in sensitivity between the two tracking servo control photodiodes, a direct current offset is caused in the tracking error signal, preventing the signal from getting zero although the main beam spot is located at the center of the track.

Therefore, some countermeasures need be taken to prevent this problem from affecting a disc player reliability.

Techniques for cancelling the direct current offset in the tracking error signal are disclosed in Japanese Non-examined Patent Publication Nos. 60-61925 and 4-34209 for example.

In the technique of No. 60-61925, a desired track is searched for by scanning the light beam spot across tracks. An offset voltage is detected from a tracking error signal obtained by the scanning. And the offset voltage is used to correct the tracking error signal.

In the technique of No. 4-34209, a track-to-track jump is performed over particular tracks to detect an offset voltage from a track error signal generated by the track jump. Each time an offset voltage is detected, a previously held offset voltage is updated. The tracking error signal is corrected by the updated offset voltage.

In the former technique, however, detection of the offset voltage from the tracking error signal generated when the light beam stop is scanned across a track requires to set a particular mode for making the beam spot cross the track.

In the latter technique, since the offset voltage is detected from the tracking error signal generated when a track-to-track jump is performed, the offset voltage cannot be detected if no jump is performed and therefore the track error signal cannot be corrected.

OBJECTS AND SUMMARY OF THE INVENTION

It is therefore an object of the present invention to provide a tracking servo circuit capable of detecting an offset in a tracking error signal caused by a sensitivity imbalance between photodiodes or the like for tracking servo control without setting a particular mode and, at the same time, capable of correcting the tracking error signal.

In carrying out the invention and according to one aspect thereof, there is provided a track servo circuit for use on an optical disc player which turns on tracking servo control upon rotatively driving a disc at initializing the player. The tracking servo circuit comprises an arithmetic unit for calculating a center level of a tracking error signal obtained when the tracking servo control is off at the initialization, a register for holding the center level calculated by the arithmetic unit, and a subtracting circuit for subtracting the center level held in the register from a tracking error signal obtained when the tracking servo control is on. Based on an output of the subtracting circuit, a position of a light beam spot relative to a track on the disc is controlled in a direction across the disc.

BRIEF DESCRIPTION OF THE DRAWINGS

The above and other objects, features and advantages of the present invention will become more apparent from the following description taken in connection with the accompanying drawings, in which:

FIG. 5a–5f are diagrams illustrating waveforms of the TE signal voltage $V_{TE}$ in various states.

DESCRIPTION OF THE PREFERRED EMBODIMENT

This invention will be described in further detail by way of example with reference to the accompanying drawings.

Figure 1:
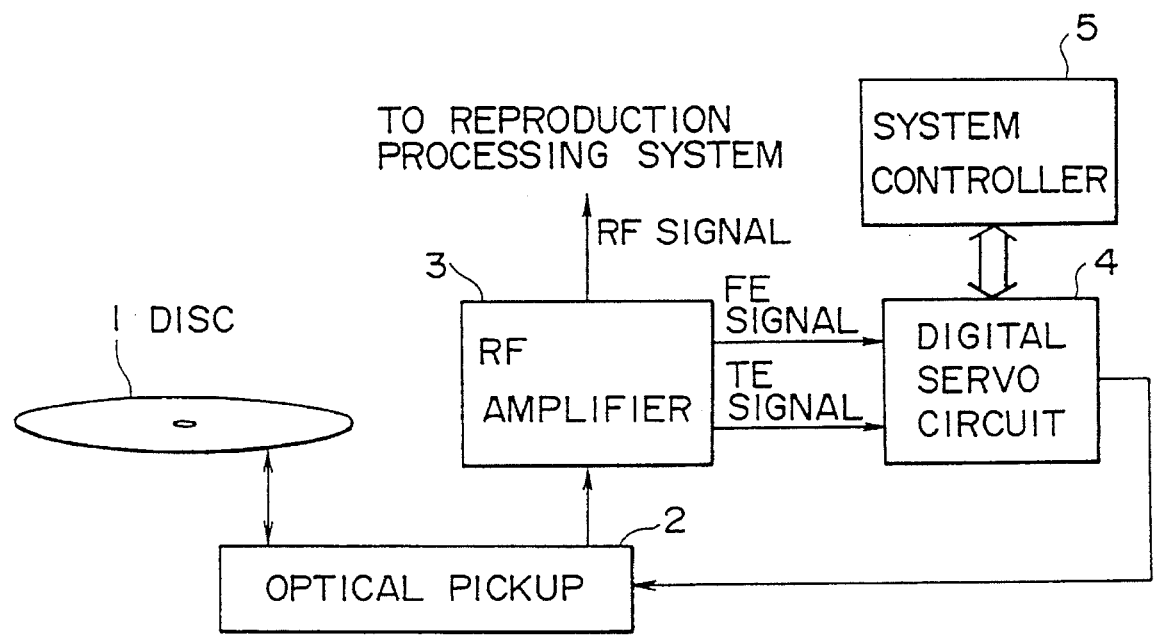
FIG. 1 is a system block diagram illustrating an example of a constitution of an optical disc player to which a tracking servo circuit according to the invention is applied.

FIG. 1 is a system block diagram illustrating an example of a constitution of an optical disc player to which a tracking servo circuit according to the invention is applied.

Referring to FIG. 1, information recorded on a disc 1 is read by an optical pickup 2. The optical pickup 2 contains a focus actuator for driving an objective lens in its optical axis direction to converge three light beams onto a surface of the disc 1, a tracking actuator for deflecting three light beam spots converted on the disc surface across the disc 1, and a light detector for receiving the light beams reflected from the disc surface. The optical pickup 2 is disposed so that it is movable across the disc 1.

Figure 2:
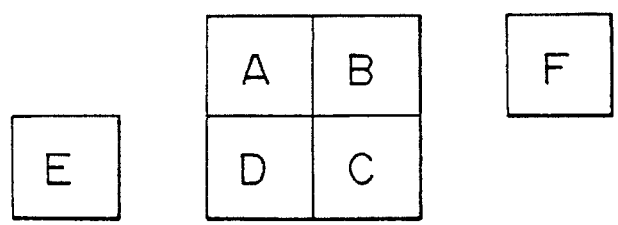
FIG. 2 is a diagram illustrating an arrangement of photodiodes in an optical pickup of the optical disc player of FIG. 1.

Referring to FIG. 2, the light detector contained in the optical pickup comprises four integrated photodiodes A through D for receiving a main reflected beam of three optical beams and a pair of photodiodes E and F for receiving two reflected beams on both sides of the main beam. Outputs of the four photodiodes A through D and the pair of photodiodes E and F are fed to an RF amplifier 3.

From the outputs of the four photodiodes A through D, the RF amplifier 3 generates a focus error (FE) signal for driving the above-mentioned focus actuator and an RF signal. From the outputs of the pair of photodiodes E and F, the RF amplifier 3 generates a tracking error (TE) signal for driving the abovementioned tracking actuator.

Figure 3:
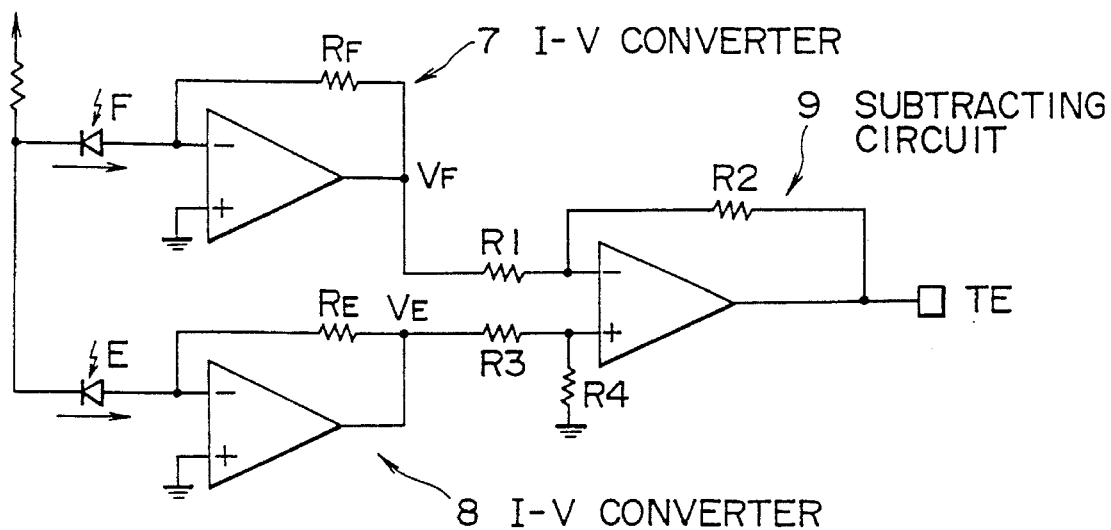
FIG. 3 is a circuit diagram illustrating an example of a TE signal generator of the optical disc player of FIG. 1.

FIG. 3 shows an example of a TE signal generator.

In the figure, the photodiodes E and F generate currents $I_E$ and $I_F$ in correspondence with intensities of the reflected light beams received. The currents $I_E$ and $I_F$ are converted by I-V converters 7 and 8 to voltages $V_E$ and $V_F$.

Given feedback resistances $R_E$ and $R_F$ of the I-V converters 7 and 8, then there are following relations between the voltages $V_E$ and $V_F$ and currents $I_E$ and $I_F$:

$$V_E = -R_E I_E \quad (1)$$

$$V_F = -R_F I_F \quad (2)$$

Further, a difference between the voltages $V_E$ and $V_F$ is obtained by a subtracting circuit 9 to provide a TE signal voltage $V_{TE}$.

Given R1=R3 and R2=R4 in the subtracting circuit 9, this TE signal voltage $V_{TE}$ becomes as follows:

$$\begin{aligned} V_{TE} &= (V_E - V_F) \times (R2/R1) \\ &= (R_F I_F - R_E I_E) \times (R2/R1) \end{aligned} \quad (3)$$

Figure 4A:
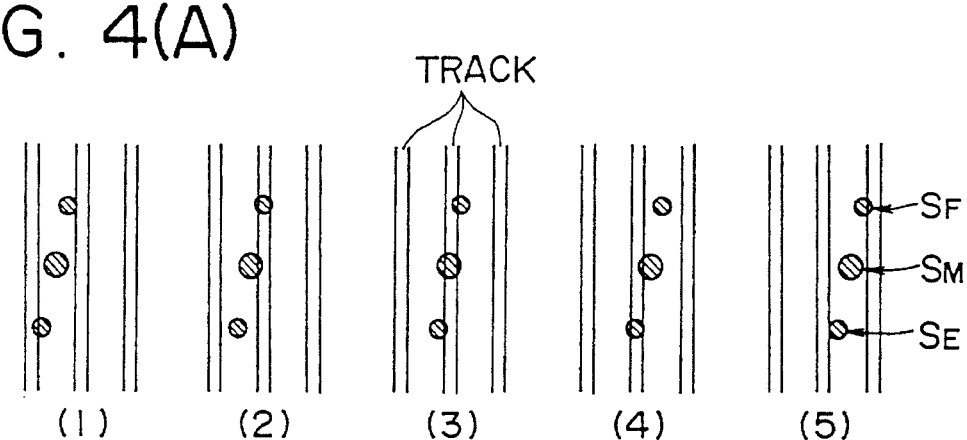
FIGS. 4A and 4B are diagrams illustrating a relationship between light beam spot positions and a TE signal voltage $V_{TE}$.
Figure 4B:
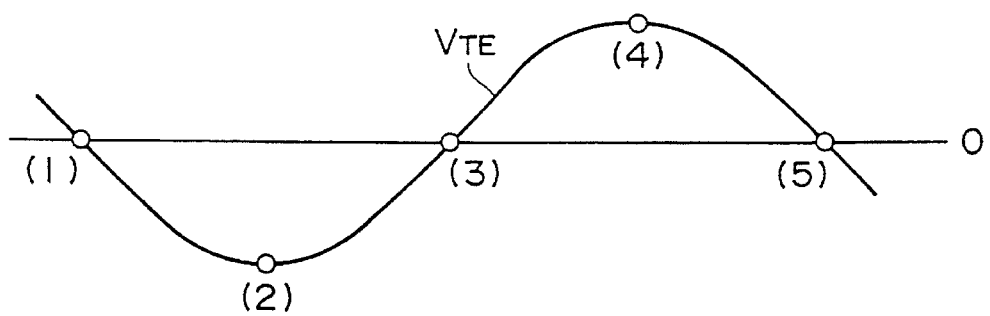

FIG. 4 (A) shows how three beam spots $S_F$, $S_M$ and $S_E$ are projected onto a track. In state (3), the main beam spot $M_S$ is projected onto the center of the track, resulting in $V_{TE}=0$.

States (1) and (5) show a deviation of a ½ track pitch, while states (2) and (4) shows a deviation of a ¼ track pitch.

FIG. 4 (B) shows how the TE signal voltage $V_{TE}$ varies with states (1) and (2) of FIG. 4 (A).

In state (4), the beam spot $S_F$ is projected off track, so that its reflected beam is maximized to enter the photodiode F, maximizing the current $I_F$. If this state is applied to equation (3), the TE signal voltage $V_{TE}$ becomes a positive maximum value.

Conversely, in state (2), $I_E$ is maximized and $I_F$ is minimized, making the TE signal voltage $V_{TE}$ a negative minimum value. In states (1), (3), and (5), reflected beams of the beam spot $S_F$ and the beam spot $S_E$ scatter to generally a same degree, resulting in $V_{TE}=0$.

That is, as clearly seen from FIG. 4 (B), the TE signal voltage $V_{TE}$ presents an "S"-shaped characteristic.

However, the above-mentioned states are established only under an ideal condition where the two tracking servo light beams with a same quantity of light are projected to proper positions, there is a proper relation in arrangement between the reflected beams and the photodiodes E and F, and the photodiodes E and F are equal in sensitivity.

Actually, even in state (3) of FIG. 4, an imbalance in the sensitivity between the photodiodes E and F for example often makes it impossible to provide $V_{TE}=0$.

This problem will be described with reference to waveforms of FIG. 5.

In FIG. 5, if $V_E$ an $V_F$ have an equal sensitivity as shown in (b) and (c), the $V_{TE}$ plots an ideal waveform shown in (a).

If the sensitivity of the photodiode F is only 60% of that of the photodiode E for example, then waveform $V_F \times$(R2/R1) becomes as shown in (d), and the $V_{TE}$ to be obtained by equation (3) becomes as shown in (e).

As clearly seen from these waveforms, even if the main beam spot $S_M$ is projected onto the center of the track, or the deviation is zero, $V_{TE}=0$ is not obtained, causing an offset (offset voltage $V_{of}$).

Depending on a magnitude of the offset voltage $V_{of}$, or an degree of the sensitivity imbalance between the photodiodes E and F, the TE signal may show a negative value even if the deviation is on the positive side.

Consequently, if the tracking servo control is turned on in the above-mentioned state, only a poor playability will result, making the optical disc player operate without stability.

To overcome the above-mentioned problem, the present invention provides a digital servo circuit 4 of FIG. 1 with a capability of correcting imbalances such as in the sensitivity between the photodiodes E and F.

The digital servo circuit 4 performs such signal processing on the FE and TE signals as filtering. Because of digital constitution, the digital servo circuit 4 can be formed on a same semiconductor chip with other digital signal processing circuits.

Implementation of the servo circuit in a digital integrated circuit (IC) provides advantages such as reduction in the number of externally attached parts, reduction in an amount of system-wide wiring, and simplification of adjustment jobs.

Referring to FIG. 1, a system controller 5 comprises a microcomputer and controls the disc player system in its entirety.

Figure 6:
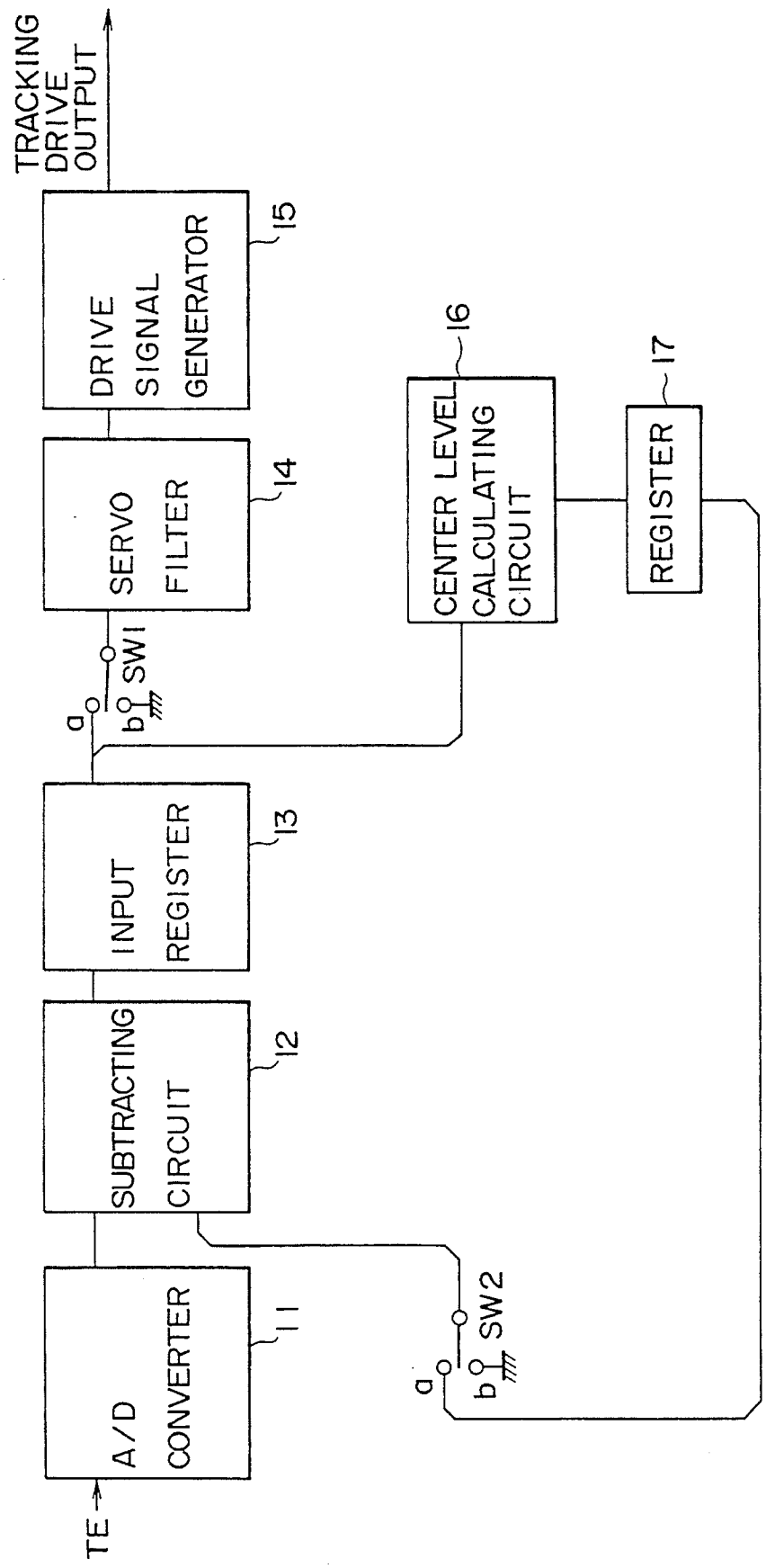
FIG. 6 is a block diagram illustrating the tracking servo circuit practiced as a preferred embodiment of the invention.

FIG. 6 is a block diagram illustrating a tracking servo circuit practiced as a preferred embodiment of the invention. The tracking servo circuit constitutes a part of the digital servo circuit 4.

Referring to FIG. 6, a TE signal generated by an RF amplifier 3 (FIG. 1) is digitized by an A/D converter 11 to be supplied to a subtracting circuit 12 as a minuend. An output of the subtracting circuit 12 is supplied to a contact a of a loop switch SW1 via an input register 13.

The loop switch SW1 is turned on/off by the system controller 5 (FIG. 1). When the loop switch SW1 is switched to the contact a, the tracking servo is turned on; when it is switched to a contact b, the tracking servo is turned off.

The TE signal thus switched is filtered by a servo filter 14 composed of a digital filter to be derived as a tracking servo output.

The tracking servo output is converted by a drive signal generator 15 comprising a PWM circuit into a drive signal for driving a tracking actuator built in the optical pickup 2 (FIG. 1).

Thus, a tracking servo loop is formed, effecting tracking control so that the main beam spot $S_M$ always traces the track at its center.

The output of the input register 13 is also supplied to a center level calculating circuit 16. The center level calculating circuit 16 comprises an LPF composed of a digital filter with DC gain=0, or an integrating circuit, for example. As will be described, this circuit calculates a center level of a traverse waveform generated in the TE signal at initializing the disc player. By constituting this circuit 16 with the integrating circuit, the number of its circuit elements is reduced and its noise performance is enhanced.

The center level thus calculated in center level calculating circuit 16 is held in a center level register 17. The center level held in the register 17 is supplied to the subtracting circuit 12 as a subtrahend via a correcting switch SW2.

The correcting switch SW2 is at a grounded contact b at initialization of the disc player. When the loop switch SW1 is set to the contact a (the tracking servo is turned on), the correcting switch SW2 is switched from the contact b to a contact a at the same time or earlier. This switching operation is controlled by the system controller 5 (FIG. 1).

The subtracting circuit 12 subtracts the center level value held in the register 17 from the TE signal to cancel an offset of the TE signal.

Described below is an operation for correcting the offset of the TE signal caused by the sensitivity imbalance between the photodiodes E and F or the like in the tracking servo circuit having the above-mentioned constitution.

When the disc player is powered on or at initialization upon disc loading, the disc 1 is rotatively driven. After a certain period of time, the tracking servo is turned on (the loop switch SW1 of FIG. 6 is set to the contact a) and the disc player enters a play mode. These operations are controlled by the system controller 5 (FIG. 1). It should be noted that focus servo is turned on immediately before or after rotation of the disc 1.

At the initialization, if the tracking servo is off, the rotation of the disc 1 generates the traverse waveform in the TE signal due to an eccentricity of the disc 1.

Generally, there is no disc without eccentricity, so that no special operation is needed at the initialization to generate the traverse waveform in the TE signal.

The TE signal having the traverse waveform is captured in the tracking servo circuit of FIG. 6 via the A/D converter 11.

At this moment, the loop switch SW1 and the correcting switch SW2 have been both set to the contacts b.

The traverse waveform through the input register 13 is supplied to the center level calculating circuit 16 where its center level is calculated. The calculated center level is held in the center level register 17. This center level matches a dashed line of FIG. 5 (*e*).

When turning on the tracking servo, the loop switch SW1 and the correcting switch SW2 are both set to the contacts a.

If, when the tracking servo is on, the TE signal is not balanced between positive and negative polarities as shown in FIG. 5 (*e*) due to the sensitivity imbalance between the photodiodes E and F or the like, subtracting in the subtracting circuit 12 the traverse center level held in the center level register 17 from the TE signal to be entered via the A/D converter 11 sets the signal to be entered in the servo filter 14 to a zero level when the deviation the track center and the main spot $S_M$ have no offset. Thus the signal becomes well balanced between positive and negative polarities.

Meanwhile, when a waveform of FIG. 5 (*f*) is compared with a waveform of FIG. 5 (*a*), there is a difference between their amplitudes. Therefore, a difference in gain hampers complete tracking servo control, requiring further gain adjustment.

However, since the digital servo circuit uses AGC (Auto Gain Control) capability, as known technology, the digital servo circuit can adjust the servo loop gain on its own without requiring human intervention or a special externally attached circuit. Therefore, no special means is required for eliminating the amplitude imbalance in the TE signal.

As mentioned above, the digital servo circuit is provided with the capability of detecting the offset of the center level of the TE signal caused by the sensitivity imbalance due to aging between the photodiodes E and F or the like and automatically correcting the offset, thereby implementing completely automatic tracking servo control which is stable and requires neither an externally attached circuit nor increased system wiring volume.

The offset of the center level of the TE signal is caused by not only the sensitivity imbalance between the photodiodes E and F but also a difference in quantity of light between a pair of tracking servo light beams, a dispersion in characteristics among circuit elements constituting the TE signal generator of FIG. 3, or a tilt or warp of the disc 1. This invention is also applicable to cancelling the offset of the TE signal caused by any of these factors.

Although the embodiment uses the center level calculating circuit 16 composed of the integrating circuit (LPF), this invention is not limited to integration technique. It is apparent that the invention can also be embodied by a method in which positive and negative peaks are obtained to be averaged or a method in which captured values are continuously added and, when 2n samples have been added, an n-bit shift operation is performed to get an average.

As described and according to the invention, there is provided a tracking servo circuit in which a tracking error signal obtained when tracking servo at disc player initialization is off is captured, its center level is calculated, the calculated center level is held in a register, and the center level held in the register is subtracted from the tracking error signal obtained when the tracking servo is on. Consequently, an offset of the tracking error signal caused by a sensitivity imbalance between tracking servo photodiodes due to their aging or the like is detected to be securely corrected, thereby enhancing playability of a disc player in which the tracking servo circuit according to the invention is used.

Further, since the digital servo circuit is provided with a capability of automatically correcting the offset of the tracking error signal, thereby realizing completely automatic tracking servo control which is stable and requires neither an externally attached circuit nor increased system wiring volume.

While preferred embodiments of the invention have been described using specific terms, such description is for illustrative purposes only, and it is to be understood that changes and variations may be made without departing from the spirit or scope of the appended claims.

What is claimed is:

1. A tracking servo circuit for an optical disc player comprising:

optical head means for recording and/or reproducing a signal on an optical disc;

tracking error signal generating means for generating a tracking error signal indicative of an offset of said optical head means from a data track;

tracking servo means responsive to said tracking error signal for controlling a relative position of said optical head means with respect to said data track;

first switching means for turning off said tracking servo means for a certain period during initialization of said optical disc player and for turning on said tracking servo means after said certain period;

center level calculating means for receiving said tracking error signal obtained during said certain period when said tracking servo means is off and for calculating the center level of said tracking error signal;

register means for holding said center level calculated by said center level calculating means;

level adjusting means coupled between said tracking error signal generating means and said tracking servo means, for adjusting said tracking error signal with said center level held in said register means when said tracking servo means is on after said certain period, wherein said tracking servo means controls said relative position between said data track and said optical head means based on the adjusted tracking error signal from said level adjusting means; and second switching means coupled between said register means and said level adjusting means for interrupting a signal path between said register means and said level adjusting means for said certain period during the initialization and for providing said signal path therebetween after said certain period.

2. The tracking servo circuit of claim 1, wherein said center level calculating means is an integrating circuit.

3. The tracking servo circuit of claim 1, further comprising means for sampling said tracking error signal and wherein said center level calculating means is an averaging circuit for averaging samples obtained by said means for sampling.

4. The tracking servo circuit of claim 3, wherein said averaging circuit averages $2^n$ samples.

5. The tracking servo circuit of claim 3, wherein said means for sampling samples said tracking error signal to provide positive and negative peak samples to said averaging circuit.

6. The tracking servo circuit of claim 1, further comprising an analog-to-digital converter for digitizing said generated tracking error signal.

7. The tracking servo circuit of claim 1, further comprising a filter for filtering said tracking error signal.

* * * * *